(12) United States Patent
Lee et al.

(10) Patent No.: US 11,048,038 B2
(45) Date of Patent: Jun. 29, 2021

(54) OPTICAL FILM FOR IMPROVING LIGHT DIFFUSION AND PREVENTING BRIGHTNESS DETERIORATION

(71) Applicant: LMS Co., Ltd, Pyeongtaek-si (KR)

(72) Inventors: Dongcheol Lee, Pyeongtaek-si (KR); Jinyeon Choi, Pyeongtaek-si (KR); Sejin Oh, Pyeongtaek-si (KR); Woojong Lee, Pyeongtaek-si (KR); Minho Kim, Pyeongtaek-si (KR); Duyi Kim, Pyeongtaek-si (KR)

(73) Assignee: LMS CO., LTD, Pyeongtaek-si (KR)

( * ) Notice: Subject to any disclaimer, the term of this patent is extended or adjusted under 35 U.S.C. 154(b) by 0 days.

(21) Appl. No.: 16/600,945

(22) Filed: Oct. 14, 2019

(65) Prior Publication Data

US 2020/0116919 A1   Apr. 16, 2020

(30) Foreign Application Priority Data

Oct. 15, 2018   (KR) .................. 10-2018-0122651

(51) Int. Cl.
    *G02B 5/02*   (2006.01)
    *F21V 8/00*   (2006.01)

(52) U.S. Cl.
    CPC ......... *G02B 6/0051* (2013.01); *G02B 5/0221* (2013.01); *G02B 5/0278* (2013.01); *G02B 6/0053* (2013.01)

(58) Field of Classification Search
    CPC .. G02B 6/0051; G02B 6/0053; G02B 5/0221; G02B 5/0278; G02B 5/045; G02F 1/133504; G02F 1/133606

(Continued)

(56) References Cited

U.S. PATENT DOCUMENTS

2012/0268964 A1* 10/2012 Bastawros ........... G02B 6/0065
                                                      362/606
2015/0138781 A1*  5/2015 Cho ..................... G02B 5/02
                                                      362/339

(Continued)

FOREIGN PATENT DOCUMENTS

JP          2016212440 A    12/2016
KR    10-2009-0096374 A      9/2009

(Continued)

OTHER PUBLICATIONS

Korean Office Action dated Mar. 18, 2020 in corresponding Patent Application No. 10-2018-0122651 (6 pages).

(Continued)

*Primary Examiner* — Karabi Guharay
(74) *Attorney, Agent, or Firm* — Polsinelli PC

(57) ABSTRACT

Disclosed is an optical film includes a first prism sheet including a plurality of first prisms arranged on one side of the first prism sheet, a second prism sheet including a plurality of second prisms arranged on one side of the second prism sheet, and a diffuser sheet including a plurality of first protrusions and a plurality of second protrusions arranged on one side of the diffuser sheet. The optical film is prepared to have a height of the first protrusions being greater than a height of the second protrusions. The optical film is further prepared that the first prism sheet, the second prism sheet and the diffuser sheet laminated where the first protrusions of the diffuser sheet is adhered to a side of the first prism sheet where no first prisms are arranged, and the first prisms of the first prism sheet are adhered to a side of the second prism sheet where no second prisms are arranged.

6 Claims, 7 Drawing Sheets

(58) Field of Classification Search
USPC .......................................................... 362/355
See application file for complete search history.

(56) References Cited

U.S. PATENT DOCUMENTS

| | | | |
|---|---|---|---|
| 2015/0212253 A1* | 7/2015 | Chung | G02B 6/0036 362/611 |
| 2017/0322348 A1* | 11/2017 | Shimamura | G02B 5/0231 |
| 2018/0120626 A1 | 5/2018 | Min et al. | |
| 2018/0172897 A1 | 6/2018 | Min et al. | |

FOREIGN PATENT DOCUMENTS

| | | |
|---|---|---|
| KR | 10-1691541 B1 | 12/2016 |
| KR | 10-1710097 B1 | 2/2017 |

OTHER PUBLICATIONS

Korean Notice of Allowance dated Feb. 1, 2021 issued in corresponding Patent Application No. 10-2018-0122651 (6 pages).

* cited by examiner

| | Ref. | 1 | 2 | 3 | 4 | 5 | 6 | 7 |
|---|---|---|---|---|---|---|---|---|
| h1 | 15μm | 15μm | 15μm | 15μm | 15μm | 15μm | 15μm | 15μm |
| h2 | 13μm | 3.5μm | 3.8μm | 4.5μm | 8.1μm | 9.0μm | 9.5μm | 11.6μm |
| Gain | 100.0% | 99.2% | 104.8% | 106.0% | 106.9% | 104.6% | 99.9% | 99.7% | ns
OPTICAL FILM FOR IMPROVING LIGHT DIFFUSION AND PREVENTING BRIGHTNESS DETERIORATION

CROSS REFERENCE TO RELATED APPLICATION

This application claims priority under 35 U.S.C. 119 to Korean Patent Application No. 10-2018-0122651, filed on Oct. 15, 2018, which is hereby incorporated by reference in its entirety.

BACKGROUND

Technical Field

The present disclosure relates to an optical film utilized for LCD modules and further relates to an optical film which can diffuse light emitted from a light source assembled in a light guide plate module.

Description of Related Art

In general, an LCD (liquid crystal display) module includes a backlight module which distributes light throughout the screen. A backlight module includes a lamp, a reflector reflecting the light emitted from a lamp and a light guided plate (LGP) distributing the light throughout the display area.

On the top of the light guided plate (LGP), an optical film including a diffuser sheet which uniformly diffuses the light and a prism sheet which condenses the diffused light is placed. An optical film may be in a laminated form, containing at least one diffuser sheet and at least one prism sheet. For example, an optical film may be in the form of a diffuser sheet and one or two prism sheets laminated.

A simple laminated optical film may have improved reliability due to the increased strength throughout the optical film but its brightness may be deteriorated. Thus, a research to minimize its deformation of the film while increasing the brightness from the laminated optical film is required. Moreover, it is required to provide a laminated optical film which can provide an air gap for better light diffusing and can maintain the strength of the film while minimizing the brightness deterioration when at least a diffuser sheet and a prism sheet is laminated.

SUMMARY

Accordingly, the object of the present disclosure is to provide an optical film comprises a first prism sheet including a plurality of first prisms arranged on one side of the first prism sheet, a second prism sheet including a plurality of second prisms arranged on one side of the second prism sheet, and a diffuser sheet including a plurality of first protrusions and a plurality of second protrusions arranged on one side of the diffuser sheet wherein a height of the first protrusions is greater than a height of the second protrusions, wherein the first protrusions of the diffuser sheet are adhered to an opposite side of the first prism sheet where the first prisms are arranged, and wherein the first prisms of the first prism sheet are adhered to an opposite side of the second prism sheet where the second prisms are arranged.

Another object of the present disclosure is to provide an optical film includes a diffuser sheet is adhered to the first prism sheet by an adhesive material and the first prism sheet is also adhered to the second prism sheet by an adhesive material.

Still another object of the present disclosure is to provide an optical film also includes a cross-sectional shape of the first and the second protrusions of the diffuser sheet is either a circle or an elliptical shape.

The present disclosure also has an object to provide an optical film comprises a height of the first protrusions $h_1$ is a distance from a surface of the one side of the diffuser sheet to a highest point of the first protrusions and a height of the second protrusions $h_2$ is a distance from a surface of the one side of the diffuser sheet to a highest point of the second protrusions respectively, and $h_1$ and $h_2$ has a relationship wherein $h_2$ is set by equation 1 $h_1:h_2=1:x$ and $0.25 \leq x \leq 0.6$.

The present disclosure also provides an optical film additionally includes a diameter of the first protrusions measured at a surface of the one side of said diffuser sheet $d_1$, and $h_1$ and $d_1$ has a relationship wherein $d_1$ is set by $d_1:h_1=1:y$ and $y \leq 0.5$ and a diameter of the second protrusions measured at a surface of the one side of the diffuser sheet $d_2$, and $h_2$ and $d_2$ has a relationship wherein $d_2$ is set by $d_2:h_2=1:z$ and $z \geq 0.15$.

Another object of the present disclosure is also to provide an optical film comprises the first protrusions in the first protrusion portion have approximately the same height among the first protrusions and the second protrusions in the second protrusion portion have approximately the same height among the second protrusions, respectively.

Still another object of the present disclosure is further to provide an optical film comprises the first protrusions and the second protrusions are arranged randomly on one side of the diffuser sheet.

The present disclosure further has an object to provide an optical film comprises the diffuser sheet including a plurality of third protrusions arranged on an opposite side of the diffuser sheet where the first and the second protrusions are arranged.

BRIEF DESCRIPTION OF THE DRAWINGS

For a more complete understanding of the present disclosure and for further features and advantages, reference is now made to the following description taken in conjunction with accompanying drawings, in which.

DETAILED DESCRIPTION

Figure 1:
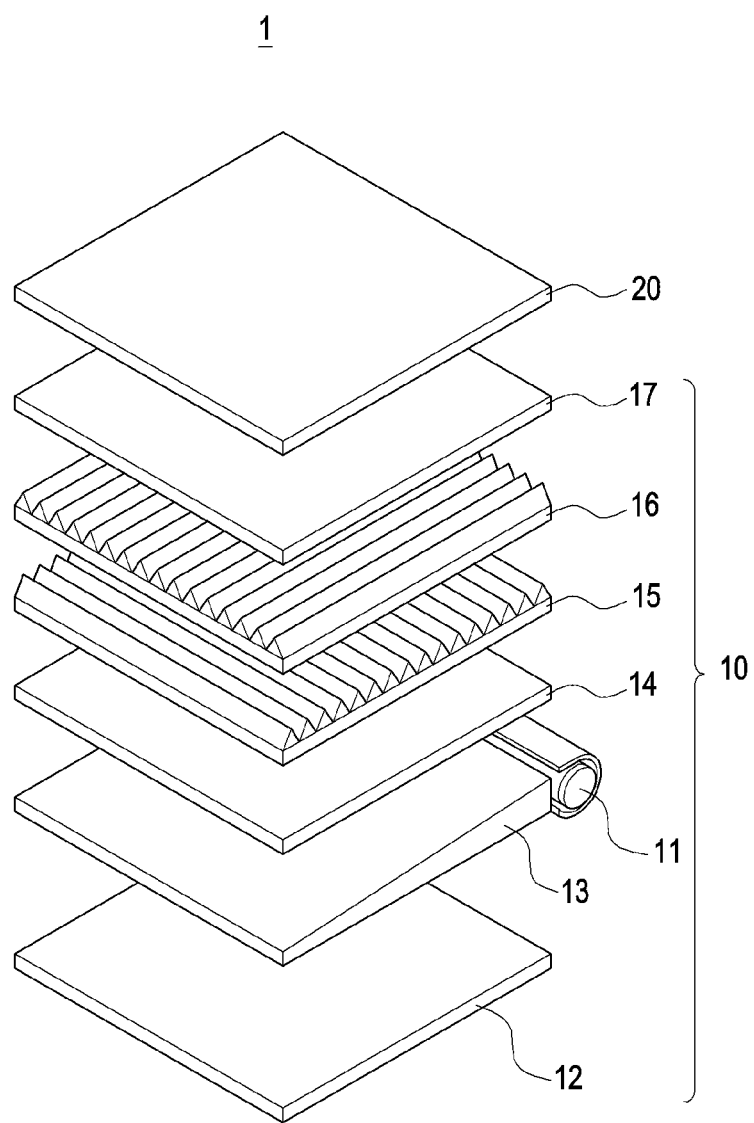
FIG. 1 is a perspective view showing each component for a liquid crystal display module in accordance with an aspect of the present disclosure.

The present disclosure will be described in detail with reference to the accompanying drawings. The same elements in the drawings have the same reference numerals and thus the cumulative explanation will be omitted for simplicity. And the described terms are defined by considering the function in the present disclosure, which may be varied according to the user's intention or convention. Therefore, the definition of the terms used should be interpreted on the basis of the content throughout this description and corresponding functions.

FIG. 1 is a perspective view showing each component for a liquid crystal display module in accordance with one of preferred aspects of the present disclosure. Referring to FIG. 1, a liquid crystal display (LCD) module (1) includes a backlight unit (10) and a liquid crystal display (LCD) panel (20). In general, a backlight unit (10) is located to the backside of the liquid crystal display panel (20) to emit a light through the liquid crystal display panel (20). A backlight unit (10) includes a light source (11), a reflector (12), a light guide plate (13), a diffuser sheet (14), prism sheets (14, 15) and a reflective polarizer sheet (17).

A light emitted from a light source (11) can be transformed as a surface light source by a light guide plate (13). In this case, a light source (11) can be either an edge-type light source or a direct-type light source. For example, a light emitted diode (LED) or a fluorescence light can be used as a light source (11).

A reflector (12) is located behind the light guide plate (13) and a light transmitted behind the light guide plate (12) can be reflected back to the front side of the light guide plate (13) by the reflector (12) thereby minimizing any brightness loss.

A diffuser sheet (14) may uniformly diffuse light transmitted from the light guide plate (13). A diffuser sheet (14) includes light diffusing beads which can diffuse light. A diffuser sheet (14) is formed by applying hardened resin solution (an element or a combination of elements selected from at least one or more from elements such as urethane acrylate, epoxy acrylate, and ester acrylate and radical-generated monomers) which is includes the light diffusing beads.

A diffuser sheet (14) also forms a protrusion pattern (or protrusions) which the protrusion has spherical, for example, with even or uneven size to enhance diffusion of the light.

Prism sheets (15 and 16) can condense incident light from a light source by utilizing an optical pattern formed on a surface of the prism sheets and can transmit to the LCD panel (20). The prism sheets (15 and 16) include the optical pattern layer with a triangle array having an inclined plane usually of 45° and arranged on the top of the transparent base film to enhance the brightness of the panel.

A reflective polarizer sheet (17) is placed on the top of the prism sheets (15 and 16) and a light condensed by the prism sheets (15 and 16) is transmitted/reflected through/by the reflective polarizer sheet (17). In this case, a transmitted light is polarized in one polarized direction and a reflected light is polarized in another polarized direction and reflected back to the prism sheets thereby recirculating the light. The LCD panel (20) refracts the light emitted from a light source (11) into a predetermined pattern with respect to an electrical signal applied to the LCD panel (20). The refracted light transmits through a color filter and a polarizing filter placed on the front of the LCD panel thereby constructing an image on the LCD panel.

Figure 2:
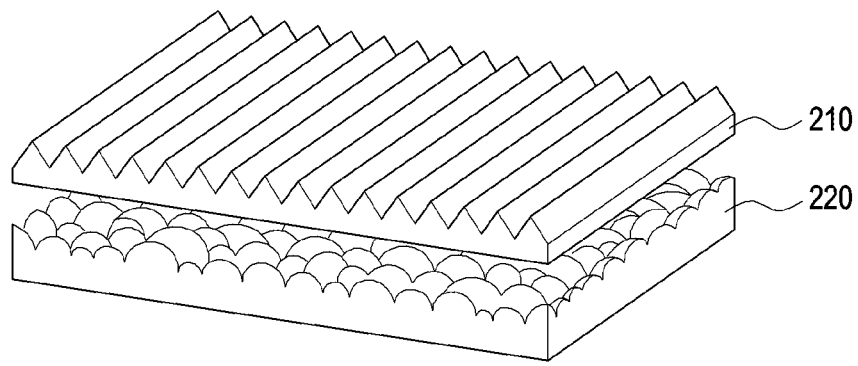
FIG. 2 shows an optical film in accordance with an aspect of the present disclosure.

FIG. 2 illustrates an optical film according to one aspect of the present disclosure.

An optical film (200) includes a prism sheet (210) and a diffuser sheet (220).

The prism sheet (210) condenses light transmitting through the diffusion sheet (220). The prism sheet (210) includes a plurality of triangle shape prisms formed on the top of a PET film (or a base film).

The diffuser sheet (220) diffuses light emitted from a light source. The diffuser sheet (220) is able to uniformly diffuse the light emitted from the light source.

The prism sheet (210) and the diffuser sheet (220) may be adhered by an adhesive material. For example, the adhesive material can be a pressure sensitive adhesive (PSA). The adhesive material may be applied to the bottom side of the prism sheet (210) where no prism patterns arranged so that the diffuser sheet (220) can be adhered to the prism sheet (210).

Accordingly, the optical film (200) may be constructed by the prism sheet (210) and diffusion sheet (220) laminated with the adhesive material.

If the optical film (200) is in the form of the prism sheet (210) and the diffuser sheet (220) laminated, the optical film (220) may face a problem of deterioration of the brightness of the optical film caused at the adhesion surface between the prism sheet (210) and the diffuser sheet (220). A detailed aspect suggesting to provide an air gap between the prism sheet (210) and the diffuser sheet (220) to minimize the deterioration of the brightness will be followed when referring to the following FIGS. 5 to 7.

The overlapping contents of the description stated in FIG. 2 may be omitted for the convenience of explanation in the followings.

Figure 3:
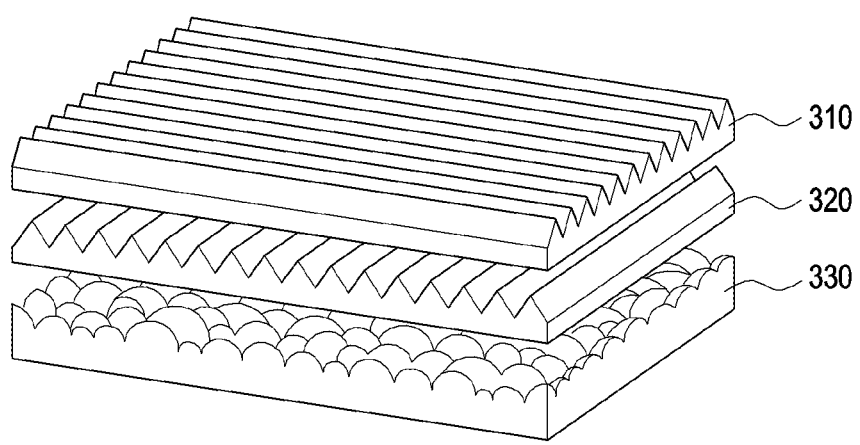
FIG. 3 shows an optical film in accordance with another aspect of the present disclosure.

FIG. 3 illustrates the optical film according to another aspect of the present disclosure.

An optical film (300) includes a first prism sheet (310), a second prism sheet (320), and a diffuser sheet (330).

The first prism sheet (310), the second prism sheet (320), and the diffuser sheet (330) may be stacked in order. In this case, the direction of prism placement on the second prism sheet (320) may be perpendicular to the direction of prism placement on the first prism sheet (310).

The aspect offers the first prism sheet (310), the second prism sheet (320), and the diffuser sheet (330) are adhered by an adhesive material.

Accordingly, the optical film (300) may be constructed by the first prism sheet (310), the second prism sheet (320), and the diffuser sheet (330) laminated with the adhesive material.

If the optical film (300) is in the form of the first prism sheet (310), the second prism sheet (320) and the diffuser sheet (330) laminated, the optical film (300) may face a problem of deterioration of the brightness of the optical film caused at the adhesion surface between the second prism sheet (320) and the diffuser sheet (330). A detailed aspect suggesting to provide an air gap between the second prism sheet (320) and the diffuser sheet (330) to minimize the deterioration of the brightness will be followed when referring to the following FIGS. 5 to 7.

Figure 4:
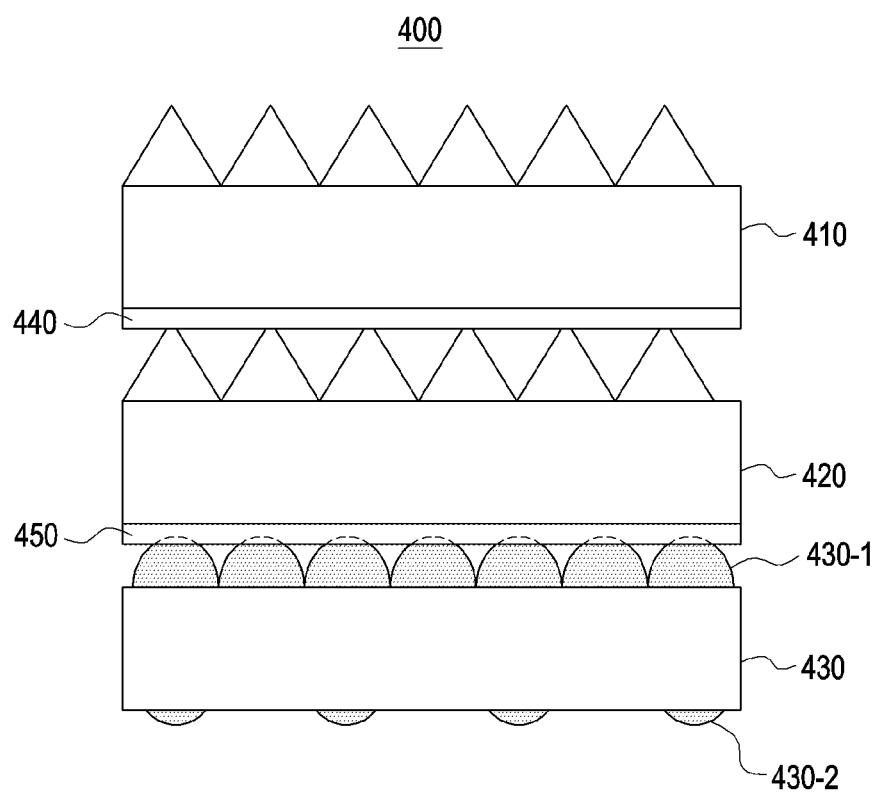
FIG. 4 shows a cross-sectional view of an optical film in accordance with an aspect of the present disclosure.

FIG. 4 is a cross-sectional view of an optical film according to one aspect of the present disclosure.

In FIG. 4, the optical film (400) includes a first prism sheet (410), a second prism sheet (420), and a diffuser sheet (430).

In the aspect, a plurality of prisms may be arranged on one side of the first prism sheet (410). In this case, the second prism sheet (420) may be placed on the other side of the first prism sheet (410). A plurality of prisms may be arranged on one side of the second prism sheet (420).

The diffuser sheet (430) may be placed on the other side of the second prism sheet (420). Here, a light diffusion pattern may be arranged on one side of the diffuser sheet (430). The light diffusion pattern may include a plurality of first protrusions (430-1) and second protrusions (430-2).

In this case, the first protrusions (430-1) and the second protrusions (430-2) may be of the same material as the diffuser sheet (430) or it can be such as PMMA (poly methyl methacrylate), a type of acrylic, transparent urethane, and resin.

In this aspect, the first prism sheet (410) and the second prism sheet (420) can be adhered by a first adhesive layer (440). In addition, the second prism sheet (420) and the diffuser sheet (430) may be adhered by a second adhesive layer (450).

A certain part of the top portion of the first protrusions (430-1) arranged on the diffuser sheet (430) may be inserted into the adhesive layer (450) thereby fixed or adhered.

Figure 5:
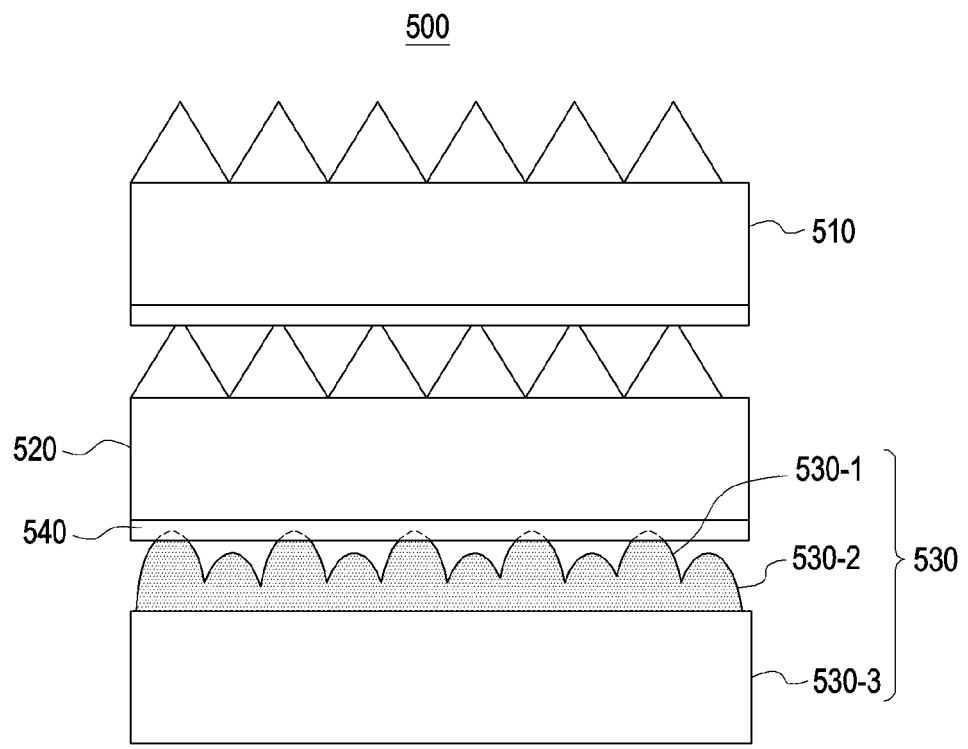
FIG. 5 shows a cross-sectional view of a diffuser sheet in accordance with an aspect of the present disclosure.

FIG. 5 is a cross-sectional view of a diffuser sheet according to one aspect of the present disclosure.

In FIG. 5, an optical film (500) includes a first prism sheet (510), a second prism sheet (520), and a diffusing sheet (530).

The diffuser sheet (530) includes a first protrusion portion (530-1), a second protrusion portion (530-2), and a base film (530-3) where each of the first protrusion portion (530-1) and the second protrusion portions (530-2) may contain a plurality of protrusions.

On one side of the diffuser sheet (530), the first protrusion portion (530-1) and the second protrusion portion (530-2) may be arranged regularly or randomly where each of the first protrusion portion (530-1) and the second protrusion portion (530-2) may include a plurality of protrusions.

In this aspect, the first protrusion portion (530-1) may be adhered to a side of the second prism sheet (520) where no prisms are arranged or formed. Furthermore, a certain part of the top portion of the first protrusion portion (530-1) can be inserted into an adhesive layer (540) and fixed. In this case, the second protrusion portion (530-2) may be placed at a certain distance from the side of the second prism sheet (520) where no prisms are arranged or formed.

In the aspect stated above, the first protrusion portion (530-1) adheres to the side of the second prism sheet (520) where no prisms are arranged or formed thereby supporting the diffuser sheet (530) on the second prism sheet (520). The second protrusion portion (530-2) is placed at a certain distance from the side of the second prism sheet (520) where no prisms are arranged or formed thereby providing a small air gap. With the air gap, light diffusion effect is enhanced thereby minimizing brightness deterioration of the optical film (500).

In the aspect, an adhesive layer (540) formed between the second prism sheet (520) and the diffuser sheet (530) may deteriorate the brightness of incident light from the diffuser sheet (530) by preventing light diffusion effect.

In this case, the air gap placed between the second prism sheet (520) and the diffuser sheet (530) can enhance the light diffusion effect thereby minimizing the brightness deterioration in accordance with the preferred aspect of the present disclosure.

In the aspect, additional protrusions for the light diffusion effect can be included on an opposite side of the diffuser sheet (530).

Furthermore, the first protrusion portion (530-1) may be formed as superimposing on the second protrusion portion (530-2).

Figure 6:
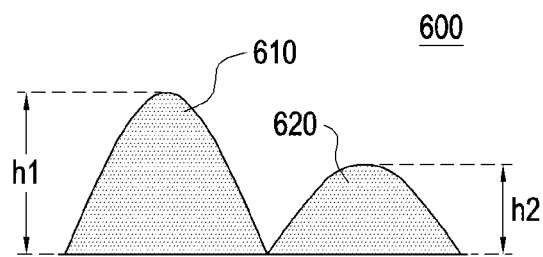
FIG. 6 shows a cross-sectional view of a diffuser sheet in accordance with another aspect of the present disclosure.

FIG. 6 is a cross-sectional view of a diffuser sheet according to one of preferred aspect of the present disclosure.

In FIG. 6, a diffuser sheet (600) includes a first protrusion (610) and a second protrusion (620).

In the aspect, a height ($h_2$) of the second protrusion (620) is smaller than a height ($h_1$) of the first protrusion (610). In addition, the height ($h_2$) of the second protrusion (620) may be defined by a proportionality of the height ($h_1$) of the first protrusion (610). Here, the relationship between the height ($h_1$) of the first protrusion (610) and the height ($h_2$) of the second protrusion (620) may be defined by the Equation 1 described below:

$$h_1 : h_2 = 1 : x \qquad \text{[Equation 1]}$$

In this case, $h_1$ is a height of the first protrusions (610) and $h_2$ is a height of the second protrusions (620) where $0.25 \leq x \leq 0.6$. If x is smaller than 0.25, the diffusing effect of the second protrusions (620) may be significantly lower. If x is larger than 0.6, the distance between the second protrusions (620) and the adhesive layer is closer, thus, the appearance of the LCD panel may become stained with black and white. In addition, due to the lack of the air gap between the second protrusions (620) and the adhesive layer, its diffusing effect and the brightness of the diffuser sheet may be deteriorated.

If the diffuser sheet is satisfied with the above mentioned condition where $0.25 \leq x \leq 0.6$, the diffusing effect is maximized with minimizing the brightness deterioration thereby a clear and bright LCD panel can be implemented.

This aspect is not limited to include first and second protrusions with the above mentioned condition. Additional protrusions can be included on the same side of the diffuser sheet (600) and its height of the additional protrusions may be decided with respect to the height $h_1$.

Figure 7:
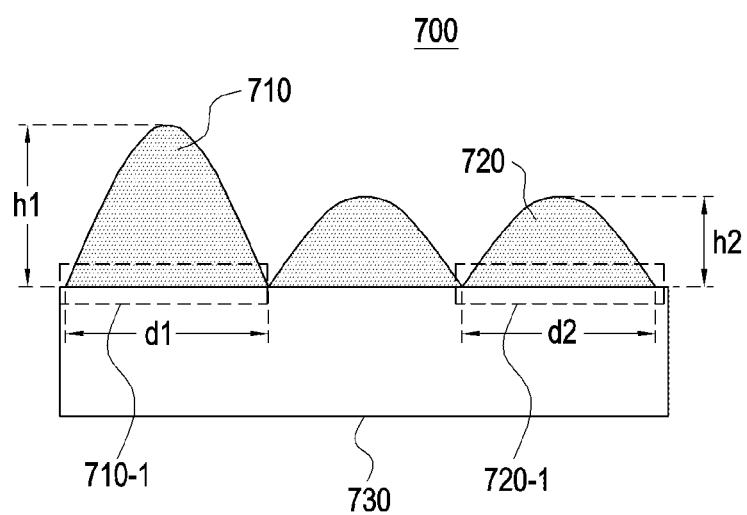
FIG. 7 shows a cross-sectional view of a diffuser sheet in accordance with still another aspect of the present disclosure.

FIG. 7 is a cross-sectional view of a diffuser sheet in accordance with another one of preferred aspects of the present disclosure.

In FIG. 7, a diffuser sheet (700) includes a first protrusion (710), a second protrusion (720) and a base film (730).

In the aspect, a first plane (710-1) where the first protrusion (710) and the base film (730) meets may have a circular or an elliptical shape. A second plane (720-1) where the second protrusion (720) and the base film (730) meets may also have a circular or an elliptical shape.

In this case, a height ($h_1$) of the first protrusion (710) is a farthest distance from the first plane (710-1) on the base film (730) to the first protrusion (710) and a height ($h_2$) of the second protrusion (720) is a farthest distance from the second plane (720-1) on the base film (730) to the second protrusion (720). The height ($h_1$) of the first protrusion (710) and the height ($h_2$) of the second protrusion (720) may be a height excluding a remnant resin layer formed from a manufacturing process of the diffuser sheet (700).

The diffuser sheet may include a plurality of first protrusions where each first protrusion has approximately the same height ($h_1$) among the first protrusions and a plurality of second protrusions where each second protrusion has approximately the same height ($h_2$) among the second protrusions. In this instance, the meaning of "approximately the same" is its height difference of each protrusion belongs to either a first protrusion group or a second protrusion group may be within 1.5 μm or less.

The first protrusion (710) and the second protrusion (720) can be partially superimposed one another.

In addition, a diameter ($d_1$) of the first plane (710-1) of the first protrusion (710) and the height ($h_1$) of the first protrusion (710) can be defined by Equation 2 described below:

$$d_1 : h_1 = 1 : y \qquad \text{[Equation 2]}$$

In this case, $d_1$ is a diameter of the first plane (710-1) of the first protrusion (710) and $h_1$ is a of the first protrusion (710) where y≥0.5. If y is greater than 0.5, the brightness and the diffusion effect is deteriorated.

The following Equation 3 defines a relationship between a diameter ($d_2$) of the second plane (720-1) of the first protrusion (720) and the height ($h_2$) of the second protrusion (720):

$$d_2 : h_2 = 1 : z \qquad \text{[Equation 3]}$$

In this case, $d_2$ is a diameter of the second plane (720-1) of the second protrusion (720) and $h_2$ is a height of the second protrusion (720) where z≥0.15. If z is less than 0.15, the brightness and the diffusion effect are deteriorated. If $d_1$ and $d_2$ are the same, it is preferable to have z being less than y stated above.

Figure 8:
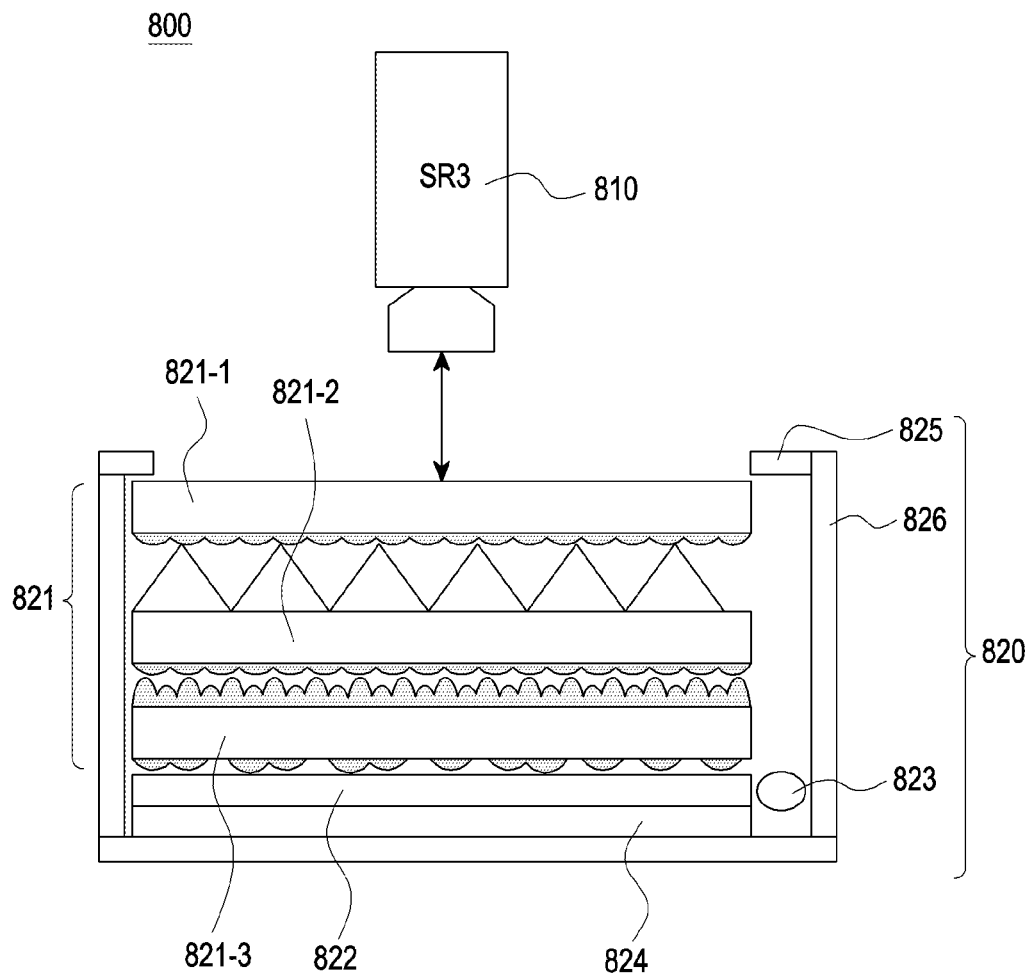
FIG. 8 shows a measurement configuration for measuring a brightness of a light incident from a lamp through an optical film in accordance with an aspect of the present disclosure.

FIG. 8 shows a measurement configuration for measuring a brightness of a light incident from a lamp through an optical film in accordance with one of preferred aspects of the present disclosure.

In FIG. 8, the measurement system may include SR3 (color luminance meter) (810) and a backlight unit (820).

SR3 (810) is a luminance measurement device that can be a high-speed spectroscopic measurement system.

The backlight unit (820) may be one example described in FIG. 1 and overlapping detailed description of the configuration may be omitted.

The backlight unit (820) may include a three-piece laminated sheet (821), a light guide panel (822), a light source (823), a reflective film (824), a shade tape (825) and a chassis (826). The three-piece laminated sheet (821) includes a upper prism sheet (821-1), a down prism sheet (821-2), and a diffuser sheet (821-3). In this case, a direction of prisms arranged on the upper prism sheets (821-1) may be perpendicular to a direction of prisms arranged on the down prism sheet (821-2).

The measurement condition for the configuration (800) requires that (1) an edge type backlight unit used in a 6-inch display, (2) a three-piece laminated optical film (821-1) where the upper prism sheet (821-1), the down prism sheet (821-2), and the diffuser sheet (821-3) are all laminated, (3) a distance between SR3 (810) and the three-piece laminated sheet (821) is 50 cm, and (4) setting a height of a first protrusions of the diffuser sheet (821-3) consistent while varying a height of a second protrusion of the diffuser sheet (821-3). A diffuser sheet illustrated in FIG. 4 can be set as a reference for the measurement of case (4) stated above.

Figures 9, 10:
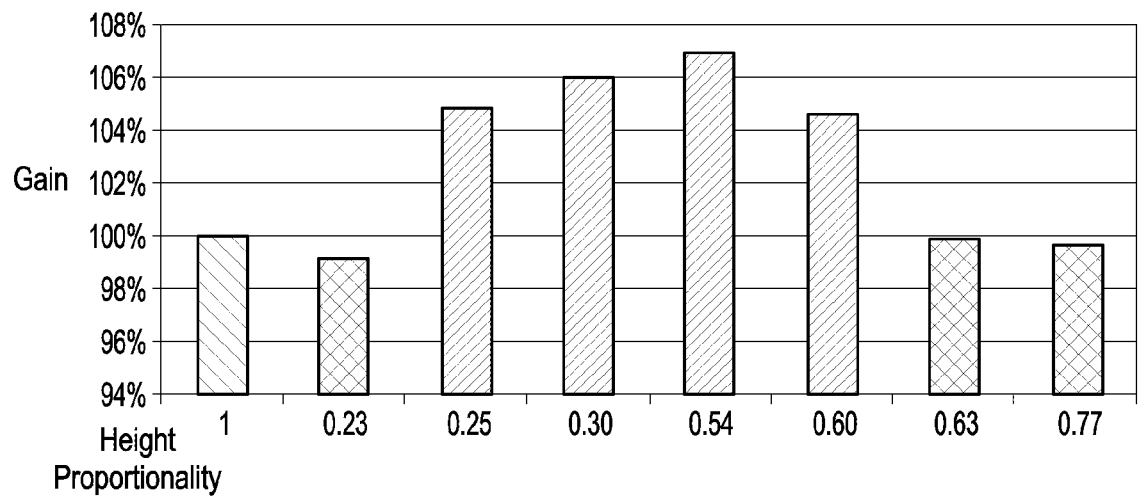
FIGS. 9-10 show a brightness measurement data in accordance with an aspect of the present disclosure.

The measurement data of the brightness changing a proportionality of a height ($h_1$) of the first protrusion and a height ($h_2$) of the second protrusion while applying a current to the backlight unit (820) is illustrated in FIGS. 9 and 10 in accordance with one of preferred aspects of the present disclosure.

In the above-mentioned measurements, a referenced diffuser sheet (821-3) has a first protrusion height $h_1$ set as 15 μm and a second protrusion height $h_2$ set as 13 μm.

Now, a diffuser sheet (821-3) for the measurement 1 (Measurement #1) has a first protrusion height $h_1$ set as 15 μm and a second protrusion height $h_2$ set as 3.5 μm and a compared brightness is 99.2% of the brightness of the reference diffuser sheet stated above where a first protrusion height $h_1$ set as 15 μm and a second protrusion height $h_2$ set as 13 μm.

A diffuser sheet (821-3) for the measurement 2 (Measurement #2) has a first protrusion height $h_1$ set as 15 μm and a second protrusion height $h_2$ set as 3.8 μm and a compared brightness is 104.8% of the brightness of the reference diffuser sheet stated above.

A diffuser sheet (821-3) for the measurement 3 (Measurement #3) has a first protrusion height $h_1$ set as 15 μm and a second protrusion height $h_2$ set as 4.5 μm and a compared brightness is 106.0% of the brightness of the reference diffuser sheet stated above.

A diffuser sheet (821-3) for the measurement 4 (Measurement #4) has a first protrusion height $h_1$ set as 15 μm and a second protrusion height $h_2$ set as 8.1 μm and a compared brightness is 106.9% of the brightness of the reference diffuser sheet stated above.

A diffuser sheet (821-3) for the measurement 5 (Measurement #5) has a first protrusion height $h_1$ set as 15 μm and a second protrusion height $h_2$ set as 9.0 μm and a compared brightness is 104.6% of the brightness of the reference diffuser sheet stated above.

A diffuser sheet (821-3) for the measurement 6 (Measurement #6) has a first protrusion height $h_1$ set as 15 μm and a second protrusion height set as 9.5 μm and a compared brightness is 99.9% of the brightness of the reference diffuser sheet stated above.

A diffuser sheet (821-3) for the measurement 7 (Measurement #7) has a first protrusion height $h_1$ set as 15 μm and a second protrusion height $h_2$ set as 11.6 μm and a compared brightness is 99.7% of the brightness of the reference diffuser sheet stated above.

Comparing the data of the Measurement #1 through #7, the Measurement #2 to #5 show higher compared brightness than the reference brightness.

In Measurement #2, the height relationship between $h_1$ and $h_2$ is where x is 0.25 and in Measurement #5, the height relationship between $h_1$ and $h_2$ is where x is 0.6. In sum, the height relationship between $h_1$ and $h_2$ with respect to x belongs to a range of 0.25≤x≤0.6. This case satisfies a condition stated above in the Equation 1.

It is well noticed from the brightness measure that the brightness deterioration of the optical film is minimized when the air gap between a down prism sheet (821-2) and a diffuser sheet (821-3) is provided to satisfy the height relationship between $h_1$ and $h_2$ is set where x belongs to a range of 0.25≤x≤0.6.

Although the three-piece laminated sheet may cause the brightness deterioration, providing a certain air gap may enhance the diffusion effect and thereby minimizing the brightness deterioration.

While the present disclosure has been described above with reference to the aspect, it would be appreciated by those skilled in the art that it is possible to variously modify and change the present disclosure, without departing from the spirit and regions of the present disclosure described in the claims below.

What is claimed is:
1. An optical film comprising;
   a first prism sheet including a plurality of first prisms arranged on one side of said first prism sheet,
   a second prism sheet including a plurality of second prisms arranged on one side of said second prism sheet, and a diffuser sheet including a plurality of first protrusions and a plurality of second protrusions arranged on one side of said diffuser sheet wherein a height of said first protrusions is greater than a height of said second protrusions, wherein said first protrusions of said diffuser sheet are adhered to an opposite side of said second prism sheet where said second prisms are arranged, wherein said second prisms of said second prism sheet are adhered to an opposite side of said first prism sheet where said first prisms are arranged, wherein a height of said first protrusions $h_1$ is a distance from a surface of said one side of said diffuser sheet to a highest portion of said first protrusions and a height of said second protrusions $h_2$ is a distance from a surface of said one side of said diffuser sheet to a highest portion of said second protrusions respectively, and $h_1$ and $h_2$ has a relationship wherein $h_2$ is set by equation 1 $h_1:h_2=1:x$ and $0.3 \leq x \leq 0.6$, wherein a diameter of said first protrusions measured at a surface of said one side of said diffuser sheet $d_1$, and $h_1$ and $d_1$ have a relationship set by $d_1:h_1=1:y$ and $y \leq 0.5$, and wherein a diameter of said second protrusions measured at a surface of said the other side of said diffuser sheet $d_2$, and $h_2$ and $d_2$ has a relationship wherein $d_2$ is set by $d_2:h_2=1:z$ and $z \geq 0.15$.

2. The optical film according to the claim 1, wherein said diffuser sheet is adhered to said first prism sheet by an adhesive material and said first prism sheet is adhered to said second prism sheet by an adhesive material.

3. The optical film according to the claim 1, wherein a cross-sectional shape of said first and second protrusions of said diffuser sheet is either a circle or an elliptical shape.

4. The optical film according to the claim 1, wherein said first protrusions have approximately the same height among the first protrusions and said second protrusions have approximately the same height among the second protrusions.

5. The optical film according to the claim 1, wherein said first protrusions and said second protrusions are arranged randomly on said one side of said diffuser sheet.

6. The optical film according to the claim 1, wherein said diffuser sheet further includes a plurality of third protrusions arranged on an opposite side of said diffuser sheet where said first and said second protrusions are arranged.

* * * * *